United States Patent [19]

Lutkenhouse

[11] 4,092,039
[45] May 30, 1978

[54] EXPANDABLE TRAILER VAN

[76] Inventor: Dan J. Lutkenhouse, 479 S. Airport Blvd., South San Francisco, Calif. 94080

[21] Appl. No.: 732,394

[22] Filed: Oct. 14, 1976

[51] Int. Cl.² .............................................. B60P 9/00
[52] U.S. Cl. ................... 296/26; 280/106 T; 296/28 M
[58] Field of Search .............. 296/26, 28 M, 27, 23 C; 280/106 T

[56] References Cited
U.S. PATENT DOCUMENTS

| 2,821,428 | 1/1958 | Webster | 296/26 |
| 3,140,116 | 7/1964 | Speas | 296/26 X |
| 3,160,436 | 12/1964 | Duddleston | 296/26 X |
| 3,374,029 | 3/1968 | Barker | 296/28 M |
| 3,694,024 | 9/1972 | Linville | 296/26 |

Primary Examiner—Joseph F. Peters, Jr.
Assistant Examiner—Donn McGiehan
Attorney, Agent, or Firm—Brady, O'Boyle & Gates

[57] ABSTRACT

An expandable trailer van having vertically extensible roof, side and end walls to facilitate the loading and unloading of the trailer, the roof and side walls being formed of flexible material forming a tarpaulin which conforms to the configuration of the cargo being transported when the roof and side walls are in the lowered position.

20 Claims, 12 Drawing Figures

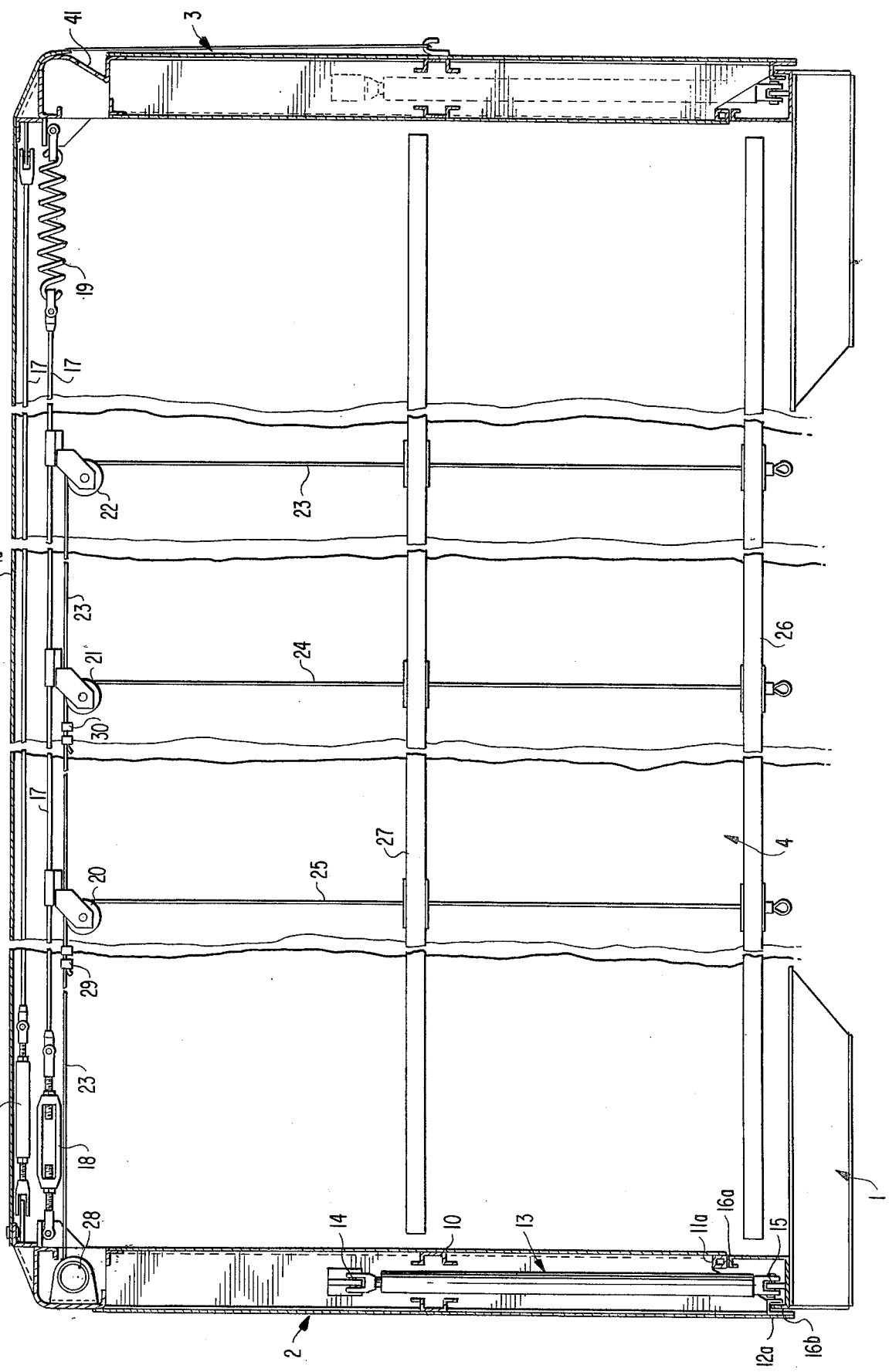

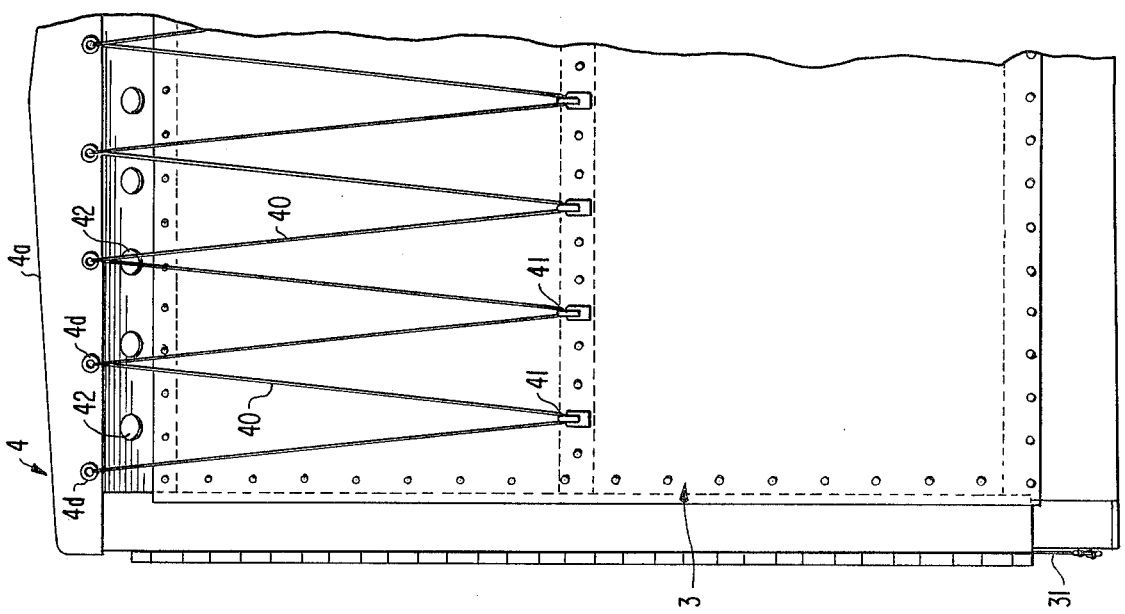
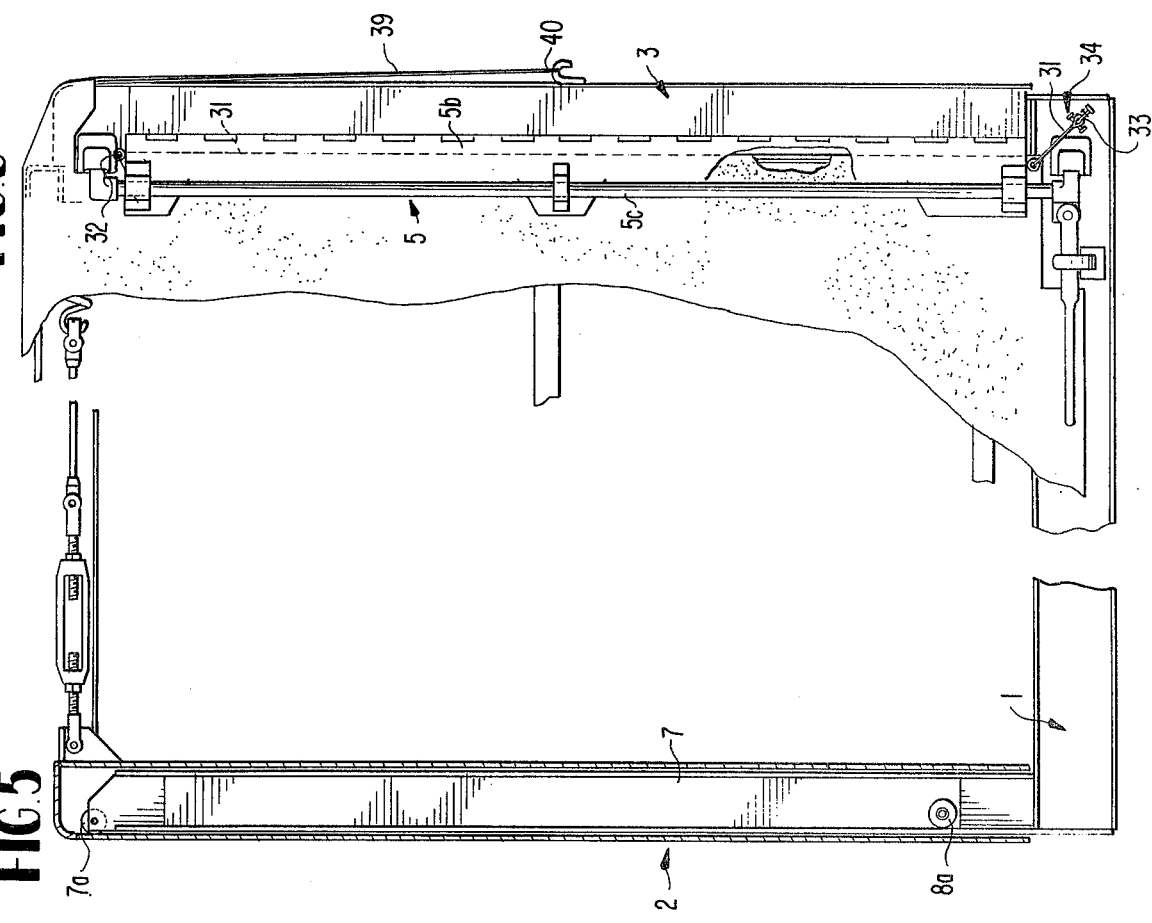

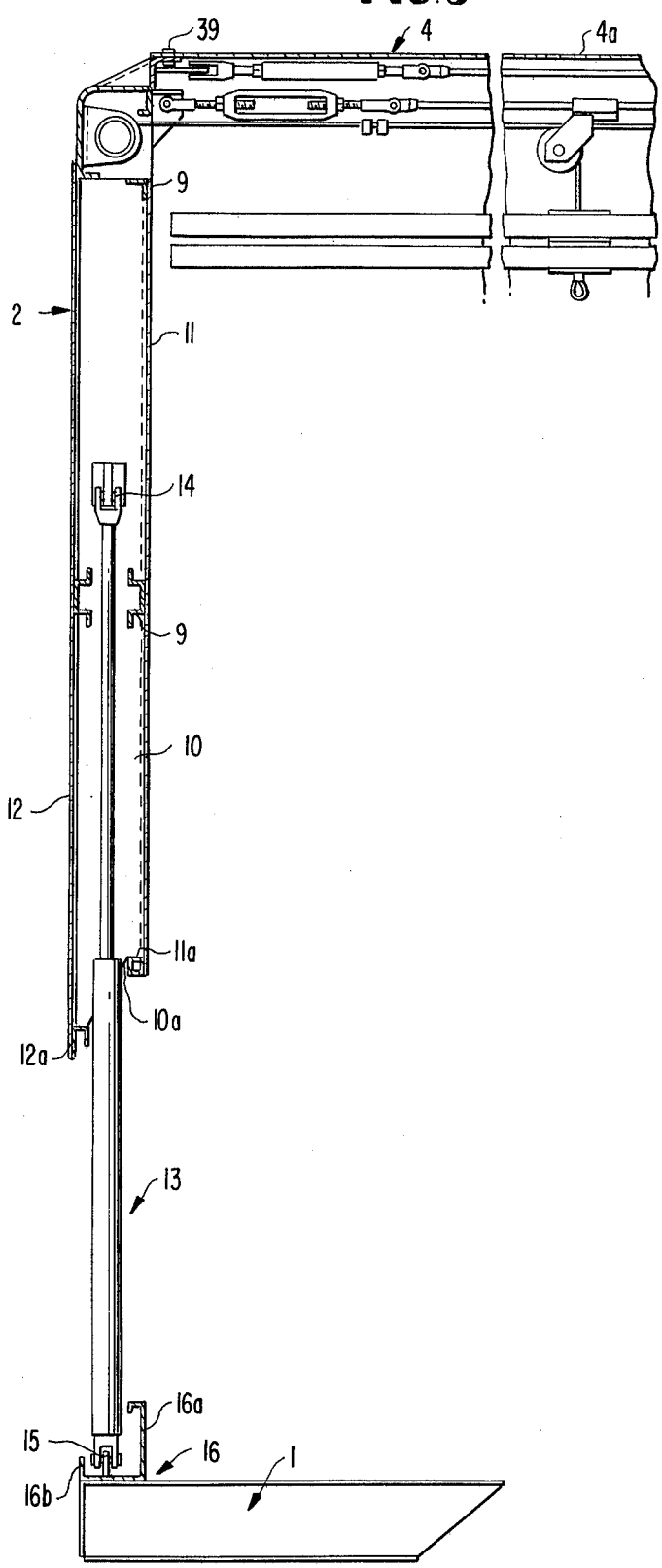
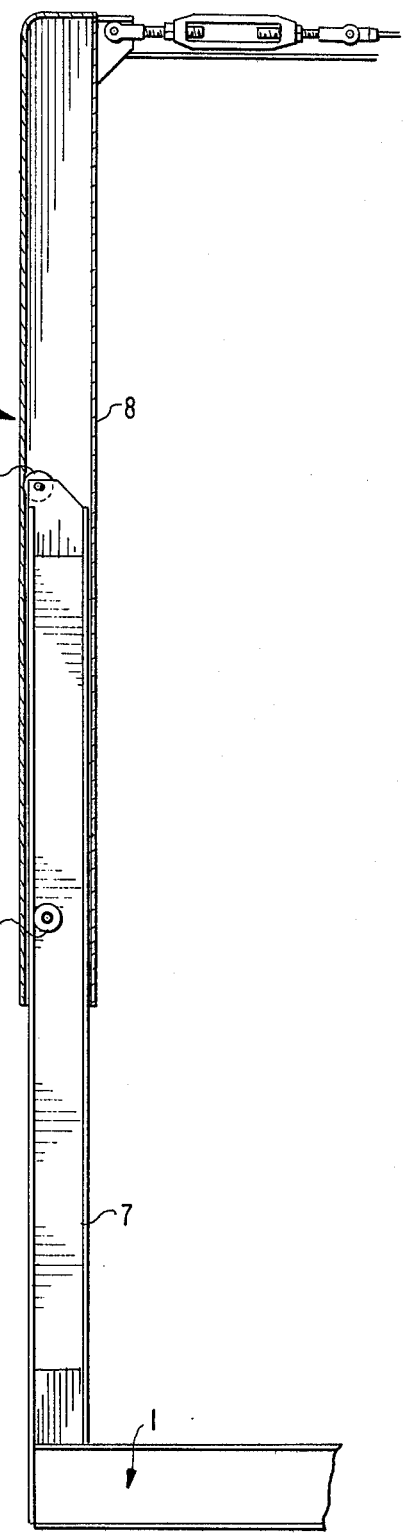
FIG.8
FIG.9

EXPANDABLE TRAILER VAN

BACKGROUND OF THE INVENTION

Heretofore, conventional trailer vans have included rigid end, side and roof walls with access openings in the side walls and/or in the rear end wall. While these vans have been satisfactory for protecting their cargo from inclement weather, they have been characterized by certain inherent disadvantages such as, limited access to the interior of the van for loading and unloading; the limited use of the storage space within the van due to the rigid walls; and high cost in the manufacture of the van.

To overcome some of the disadvantages of conventional vans, flat bed trailers have been employed with the cargo being covered by a tarpaulin. While these trailers provide easy access for loading and unloading, the tarpaulin has not provided the cargo with adequate protection from the elements, and the size and weight of the tarpaulin has made it difficult, if not impossible, for one man to handle.

After considerable research and experimentation, the trailer van of the present invention has been devised to include the advantages of conventional vans and tarpaulin covered trailers while eliminating the disadvantages therein. The trailer van of the present invention includes vertically extensible roof, side and end walls disclosed generally in the following U.S. Pat. Nos.: 2,797,124 — Jun. 25, 1957 — Haupti, 3,098,456 — Jul. 23, 1963 — Elsner, 3,140,116 — Jul. 7, 1964 — Speas, 3,160,436 — Dec. 8, 1964 — Duddleston, 3,319,994 — May 16, 1967 — Smock, 3,694,024 — Sep. 26, 1972 — Linville.

The expandable trailer van of the present invention being an improvement over the expandable vehicle bodies disclosed in the above-noted patents in that the roof, and side walls are formed of flexible material forming a tarpaulin whereby the roof and side walls are adapted to conform to the cargo being transported, and the edge of the tarpaulin is tightly held against the trailer frame to provide an adequate seal to protect the cargo during the transport thereof.

BRIEF DESCRIPTION OF THE DRAWINGS

FIG. 4 is a fragmentary, side elevational view of the van, partly in section;

FIG. 5 is a fragmentary, side elevational view, partly in section, of the telescopic corner posts of the van;

FIG. 6 is a fragmentary, side elevational view of the locking hinge and associated cable tensioner for the tarpaulin;

FIG. 7 is a fragmentary end elevational view of the assembly shown in FIG. 6;

FIG. 8 is a fragmentary, side elevational view, partly in section, showing one of the elevating fluid motors, and associated frame assembly in the raised position;

FIG. 9 is a fragmentary, side elevational view, partly in section, showing the relative positions of the telescopic sections of the corner posts in the raised position;

DESCRIPTION OF THE PREFERRED EMBODIMENT

Figure 1:
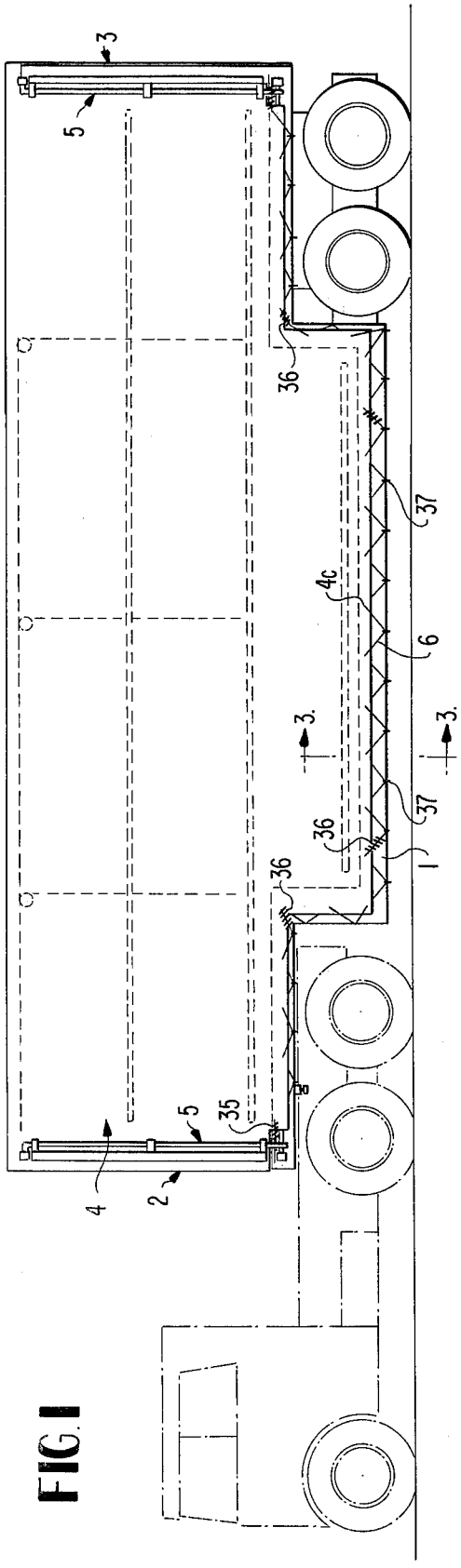
FIG. 1 is a side elevational view of the expandable trailer van of the present invention shown in the lowered position.
Figure 2:
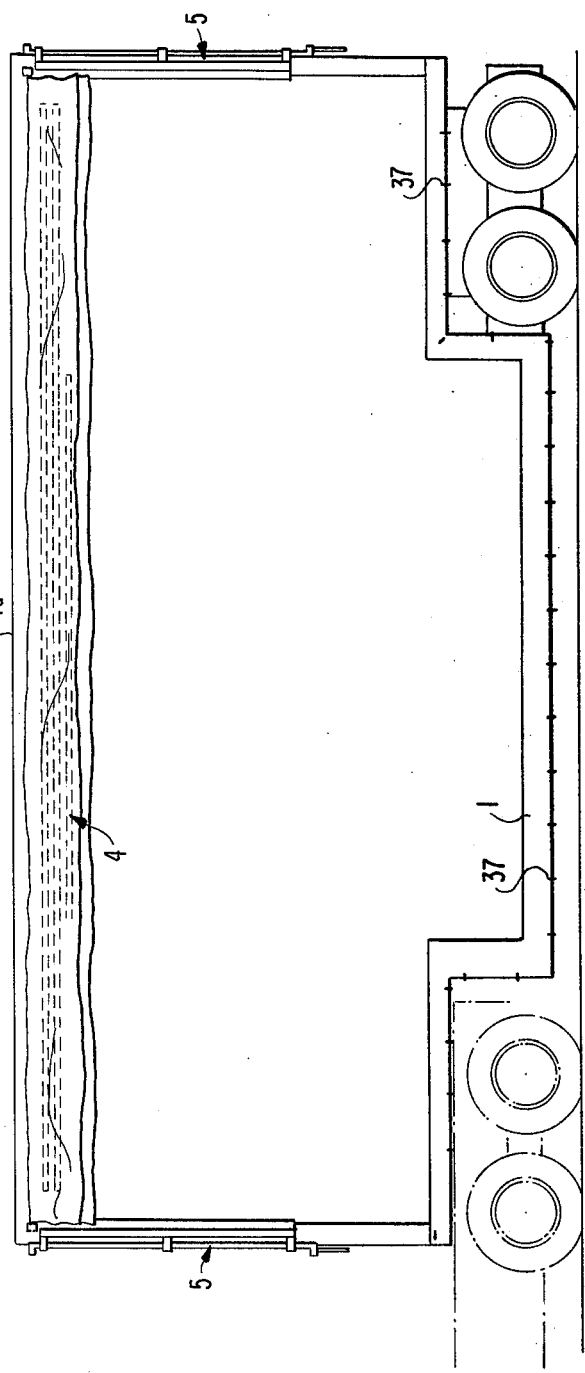
FIG. 2 is a side elevational view of the van in the expanded position with the tarpaulin in the raised position.

Referring to the drawings, and more particularly to FIGS. 1 and 2 thereof, the expandable trailer van of the present invention comprises, essentially, a chassis frame 1 having a rigid front wall 2, a rigid rear wall 3, and a one-piece tarpaulin 4 extending therebetween forming the roof and side walls of the trailer. A locking assembly 5 is provided at the front and rear edges of the tarpaulin, and a flexible cable 6 is provided along the lower edges of the tarpaulin for sealingly securing the edges of the tarpaulin to the trailer frame, to be described more fully hereinafter.

As will be seen in FIGS. 8, 9, 10 and 11, the front wall 2 of the van comprises a pair of vertically extending I-beams 7 connected to opposite sides of the frame 1 to form corner posts for slidably receiving tubular sections 8. The upper end of each I-beam has a roller 7a connected to the web thereof engaging one of the inner walls of the tubular section 8, and the lower end of each tubular section has a pair of rollers 8a connected thereto which engage the flanges of the I-beam. Suitable transverse and vertically extending frame members 9 and 10 are connected to the tubular sections 8 to which inner and outer walls 11 and 12 are secured to thereby form a hollow wall in which a hydraulic cylinder 13 is disposed having its piston rod end connected to one of the vertical frame members 10 as at 14, and its cylinder end connected to the chassis frame as at 15. As will be seen in FIG. 8, the lower end of each vertical frame member 10 is bevelled or inclined as at 10a and extends between a transversely extending tubular member 11a secured to the inner surface of the wall 11, and a channel 12a secured to the inner surface of the outer wall 12. A transversely extending sill 16 is secured to the chassis frame 1 and is formed as a channel having a long leg 16a adapted to support the tubular member 11a, and a short leg 16b adapted to be received within the channel 12a when the wall 2 is in the lowered position as shown in FIG. 4. By the construction and arrangement of the lower end of the wall 2 and the sill 16, a weather strip or baffle is provided to form a seal between the front wall 2 and the chassis frame 1.

While the details of the front wall 2 have been described, it is to be understood that the basic components are also included in the rear wall 3 as shown in FIG. 4.

Figure 11:
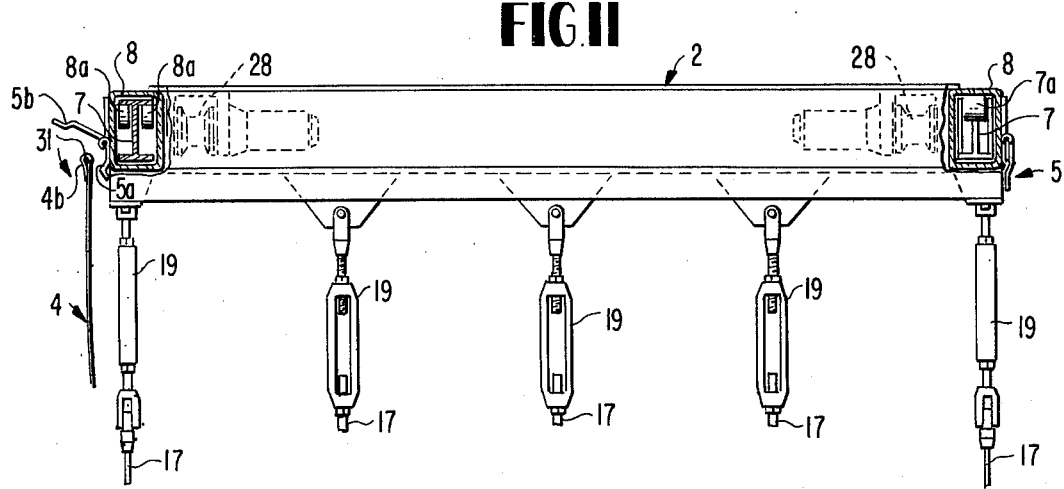
FIG. 11 is a fragmentary, top plan view of the frame assembly for supporting the roof portion of the tarpaulin.

As will be seen in FIGS. 4 and 11, a plurality of longitudinally extending cables 17 are connected between the front wall 2 and the rear wall 3 and are properly tensioned by suitable turnbuckles 18 and tension springs 19. The cables are provided not only to support the roof portion 4a of the tarpaulin 4 but also the outermost cables, that is, the cables nearer the sides of the chassis frame 1, are employed for supporting a plurality of pulleys 20, 21, 22 through which a plurality of pull cables 23, 24 and 25 are reeved. The lower end of each pull cable is connected to a longitudinally extending frame 26 stitched, or otherwise suitably secured, to the lower end portion of the side wall of the tarpaulin 4, the pull cables being slidable through another longitudinally extending frame 27 secured to the medial portion of the tarpaulin side wall. Cable 23 is reeved through pulleys 22, 21, 20 and is connected to a winch 28 mounted at the upper end portion of the front wall 2, each of the pull cables 24 and 25 being connected to the main pull cable 23 as at 29 and 30, respectively. When the winches 28 are actuated to pull cable 23, cables 24 and 25 are simultaneously pulled whereby the side walls of the tarpaulin are lifted to the elevated position as shown in FIG. 2.

One of the features of the present invention is the manner in which the edges of the tarpaulin are tightly secured to the front wall 2, rear wall 3, and chassis frame 1 when the tarpaulin has been lowered to cover the cargo as shown in FIG. 1. As will be seen in FIG. 11, the vertical edges of the tarpaulin are provided with a selvage as at 4b through which a cable 31 extends. One end of each cable 31 is connected to the upper wall portions of the front and rear walls at 32 (FIG. 6), and the opposite or lower end of each cable 31 is connected to a lever 33 pivotally connected to the chassis frame as at 34, the lever being pivotal to a locked position to tension the cable 31 to thereby hold the edge of the tarpaulin tightly against a fixed plate 5a (FIG. 11) of the locking assembly 5. The locking assembly 5 also includes a movable plate 5b which is hingedly connected to the fixed plate 5a, the edge of the tarpaulin being disposed between the plates 5a and 5b to thereby secure the vertical edges of the tarpaulin to the front and rear walls of the van. To secure the hinged plates in a locked position, a conventional dog-lock assembly 5c is provided and is adapted to engage the free edge of the pivotal plate 5b when in the locked position as shown in FIG. 6.

Figure 3:
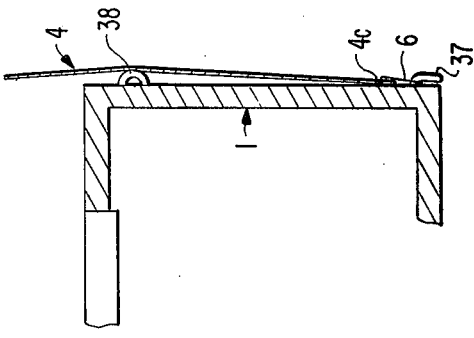
FIG. 3 is a view taken along line 3—3 of FIG. 1.
Figure 10:
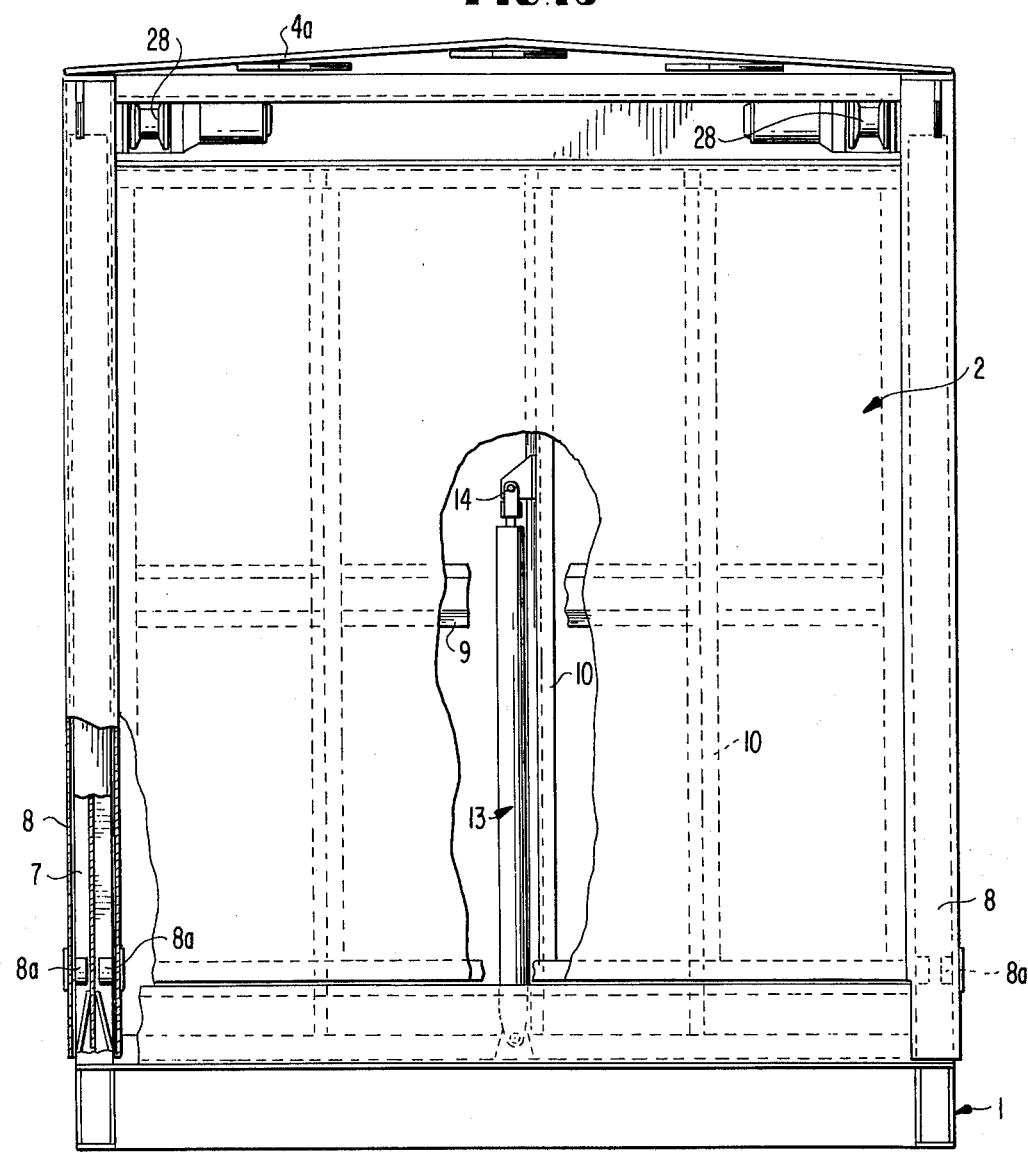
FIG. 10 is a fragmentary, front elevational view of the van, partly in section.

Referring to FIGS. 1 and 3, the lower edges of the tarpaulin are secured to the chassis by the tensioned flexible cable 6 extending through grommets 4c provided in the lower edge poriton of the tarpaulin. Each end of the cable 6 is connected to the chassis frame by a tension spring 35, and additional tension springs 36 are positioned along the length of the cable to impart a suitable tension thereto. As will be seen in FIG. 3, a plurality of hooks 37 are secured to the lower edge of the chassis frame for receiving the cable 6, and a bead 38 forming a flange extends along the chassis frame against which the tarpaulin abuts whereby dust and dirt are prevented from entering the interior of the tarpaulin.

To complete the securement of the tarpaulin, the roof portion is secured to the upper end front wall by suitable fasteners 39 (FIG. 8) and to the rear wall 3 (FIG. 7) by a cable 40 laced through grommets 4d on the rear edge of the tarpaulin and engaged by hooks 41 carried on the rear wall 3. Vent holes 42 are also provided at the upper end of the rear wall 3 to allow air to be drawn from the interior of the van due to the semi-vacuum condition which is created at the rear end wall while the van is travelling at high speeds.

In the operation of the expandable trailer van, thus far described, when the winches 28 are energized, the side walls of the tarpaulin are raised to a desired height, approximately 8 feet, as shown in FIG. 2, and the hydraulic cylinders 13, housed in the front and rear end walls 2 and 3, are actuated to raise the end walls and associated roof portion 4a of the tarpaulin an additional 4 feet, whereby the sides and roof of the van are completely out of the way to facilitate the loading and unloading of the van. Assuming that the van has been loaded, the front and rear walls are lowered and then the side walls of the tarpaulin are lowered as shown in FIG. 1. By fabricating the roof and side walls of the van from one piece of flexible plastic or rubberized material, the roof and side walls conform to the shape of the cargo. Thus, if a few boxes of cargo are a few inches higher than the remainder of the load, the van's roof expands upward these few inches, and if the cargo protrudes a few inches on the side, the flexible sides expand the required few inches.

After the tarpaulin has been lowered, the front and rear edges thereof are tightly sealed to the front and rear walls by means of the locking assembly 5, and the lower edge of the tarpaulin is sealed against the chassis frame 1 by the cable assembly 6, as described hereinabove.

Figure 12:
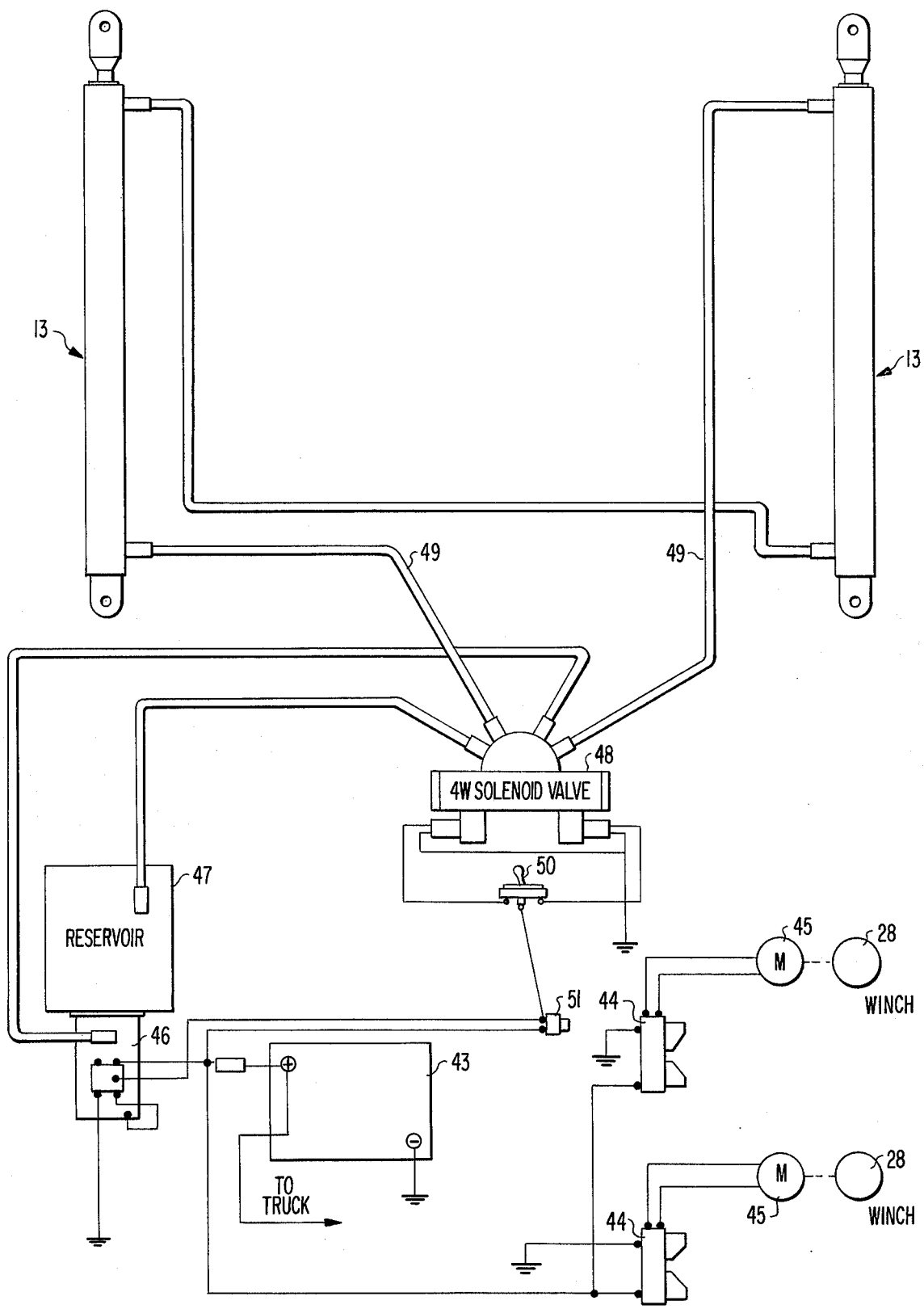
FIG. 12 is a schematic drawing of the hydraulic and electrical system employed in the expandable trailer van of the present invention.

The electrical and hydraulic system for energizing the winches 28 and the hydraulic cylinders 13 is illustrated in FIG. 12 and includes a battery 43 connected through a pair of switches 44 to the electric motors 45 of the winches 28. The battery is also connected to a motor drive pump 46 which is adapted to pump hydraulic fluid from a reservoir 47 to a four-way solenoid valve 48 which, in turn, is connected to the cylinders 13 through hydraulic supply and exhaust lines 49; the solenoid valve also being provided with a toggle switch 50 and a button switch 51 which are electrically connected to the battery 43.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. An expandable trailer van comprising, a chassis frame, an extensible front wall and an extensible rear wall connected to said chassis frame, a flexible tarpaulin connected to the front and rear walls, said tarpaulin forming the roof and side walls of said van, means connected to the tarpaulin for raising and lowering the side walls thereof, means connected to said front and rear walls for raising and lowering said walls, and means connected between the side edges of the tarpaulin and the side edges of the front and rear walls for sealingly connecting the tarpaulin edges to the respective wall edges; said sealing means comprising a vertically disposed cable extending through a selvage on each vertical edge of the tarpaulin, one end of each cable being connected to the upper end portions of the front and rear walls on each side thereof, the lower end of each cable being connected to the chassis frame, and tension means connected between the lower end of each cable and the chassis frame.

2. An expandable trailer van according to claim 1, wherein means are connected between the lower edges of the tarpaulin and the chassis frame for sealingly connecting the lower edges of the tarpaulin to the chassis frame.

3. An expandable trailer van according to claim 2, wherein the means for sealingly connecting the lower edges of the tarpaulin to the chassis frame comprises, a plurality of grommets mounted in the lower edge portion of said tarpaulin, a flexible cable extending through said grommets, a tension spring connected between each end of said flexible cable and the chassis frame, a plurality of tension springs positioned along the length of said flexible cable, a plurality of hooks secured to the lower edge of the chassis frame for receiving the flexible cable, and a bead extending longitudinally of the chassis frame forming a flange against which the tarpaulin abuts to thereby prevent dust and dirt from entering the interior of the tarpaulin.

4. An expandable trailer van according to claim 1, wherein each of the front and rear walls comprises, vertically extending beams rigidly connected to opposite corners of said chassis frame, tubular sections slidably mounted on each beam, and inner and outer wall members connected to said tubular sections, said inner and outer walls being spaced from each other to form a hollow wall construction.

5. An expandable trailer van according to claim 4, wherein the means for raising and lowering the end walls comprises, a hydraulic cylinder positioned in the interior of each wall, one end of said hydraulic cylinder being connected to said chassis frame and the other end of said hydraulic cylinder being connected to the respective end wall.

6. An expandable trailer van according to claim 4, wherein a transversely extending sill is secured to each end of the chassis frame, each sill being formed as an upwardly opening channel having one leg longer than the other leg, a downwardly opening channel secured to the lower edge of each outer wall member and adapted to receive the short leg of the sill when the wall is in the lowered position, and the lower edge of the inner wall member engaging the top edge of the long leg of the sill when the wall is in the lowered position.

7. An expandable trailer van according to claim 4, wherein a plurality of vent holes are provided in the upper end portion of the rear wall.

8. An expandable trailer van according to claim 1, wherein means for raising and lowering the side walls of the tarpaulin comprises a cable-winch assembly connected to each side wall, each said assembly comprising, a cable extending longitudinally of the chassis frame and connected at each end to the upper end portions of the front and rear walls, a plurality of pulleys mounted on said cable, and a plurality of pull cables reeved through said pulleys, one end of each pull cable being connected to the tarpaulin side wall and the opposite end of each pull cable being operatively connected to a winch mounted in one of the end walls.

9. An expandable trailer van according to claim 1, wherein a plurality of longitudinally extending cables are connected between the front wall and rear wall for supporting the roof portion of the tarpaulin.

10. An expandable trailer van according to claim 1, wherein a vertically extending plate is hingedly connected to the vertical side edges of the front and rear walls, each selvage edge of the tarpaulin and associated cable being adapted to be clamped between a respective hinged plate and wall side edge, and a lock assembly mounted between the chassis frame and the upper end of each wall and engaging the hinged plate for holding the plate in the clamped position.

11. An expandable trailer van comprising a chassis frame, an extensible front wall and an extensible rear wall connected to said chassis frame, a flexible tarpaulin connected to the front and rear walls, said tarpaulin forming the roof and side walls of said van, means connected to the tarpaulin for raising and lowering the side walls thereof, and means connected to said front and rear walls for raising and lowering said walls; each of the front and rear walls comprising, vertically extending beams rigidly connected to opposite corners of said chassis frame, tubular sections slidably mounted on each beam, inner and outer wall members connected to said tubular sections, said inner and outer walls being spaced from each other to form a hollow wall construction; and a transversely extending sill secured to each end of the chassis frame, each sill being formed as an upwardly opening channel having one leg longer than the other leg, a downwardly opening channel secured to the lower edge of each outer wall member and adapted to receive the short leg of the sill when the wall is in the lowered position, and the lower edge of the inner wall member engaging the top edge of the long leg of the sill when the wall is in the lowered position.

12. An expandable trailer van according to claim 1, wherein means are connected between the side edges of the tarpaulin and the side edges of the front and rear walls for sealingly connecting the tarpaulin edges to the respective wall edges.

13. An expandable trailer van according to claim 12, wherein the means for sealingly connecting the tarpaulin side edges to the front and rear walls comprises, a vertically disposed cable extending through a selvage on each vertical edge of the tarpaulin, one end of each cable being connected to the upper end portions of the front and rear walls on each side thereof, the lower end of each cable being connected to the chassis frame, and tension means connected between the lower end of each cable and the chassis frame.

14. An expandable trailer van according to claim 13, wherein a vertically extendng plate is hingedly connected to the vertical side edges of the front and rear walls, each selvage edge of the tarpaulin and associated cable being adapted to be clamped between a respective hinged plate and wall side edge, and a lock assembly mounted between the chassis frame and the upper end of each wall and engaging the hinged plate for holding the plate in the clamped position.

15. An expandable trailer van according to claim 11, wherein means are connected between the lower edges of the tarpaulin and the chassis frame for sealingly connecting the lower edges of the tarpaulin to the chassis frame.

16. An expandable trailer van according to claim 15, wherein the means for sealingly connecting the lower edges of the tarpaulin to the chassis frame comprises, a plurality of grommets mounted in the lower edge portion of said tarpaulin, a flexible cable extending through said grommets, a tension spring connected between each end of said flexible cable and the chassis frame, a plurality of tension springs positioned along the length of said flexible cable, a plurality of hooks secured to the lower edge of the chassis frame for receiving the flexible cable, and a bead extending longitudinally of the chassis frame forming a flange against which the tarpaulin abuts to thereby prevent dust and dirt from entering the interior of the tarpaulin.

17. An expandable trailer van according to claim 11, wherein the means for raising and lowering the end walls comprises, a hydraulic cylinder positioned in the interior of each wall, one end of said hydraulic cylinder being connected to said chassis frame and the other end of said hydraulic cylinder being connected to the respective end wall.

18. An expandable trailer van according to claim 11, wherein means for raising and lowering the side walls of the tarpaulin comprises a cable-winch assembly connected to each side wall, each said assembly comprising, a cable extending longitudinally of the chassis frame and connected at each end to the upper end portions of the front and rear walls, a plurality of pulleys mounted on said cable, and a plurality of pull cables reeved through said pulleys, one end of each pull cable being connected to the tarpaulin side wall and the opposite end of each pull cable being operatively connected to a winch mounted in one of the end walls.

20. An expandable trailer van according to claim 11, wherein a plurality of vent holes are provided in the upper end portion of the rear wall.

20. An expandable trailer van according to claim 11, wherein a plurality of longitudinally extending cables are connected between the front wall and rear wall for supporting the roof portion of the tarpaulin.

* * * * *